US006575090B1

(12) United States Patent
Vienneau et al.

(10) Patent No.: US 6,575,090 B1
(45) Date of Patent: Jun. 10, 2003

(54) TICKET PRINTER FOR GAMING MACHINES

(76) Inventors: Daniel Vienneau, 699 Champlain Street, Dieppe, New Brunswick (CA), E1A 1P6; Rick Saulnier, 699 Champlain Street, Dieppe, New Brunswick (CA), E1A 1P6; Aurèle Comeau, 699 Champlain Street, Dieppe, New Brunswick (CA), E1A 1P6; Michel Vienneau, 699 Champlain Street, Dieppe, New Brunswick (CA), E1A 1P6; Pierre Doucet, 699 Champlain Street, Dieppe, New Brunswick (CA), E1A 1P6

( * ) Notice: Subject to any disclaimer, the term of this patent is extended or adjusted under 35 U.S.C. 154(b) by 0 days.

(21) Appl. No.: 10/025,620

(22) Filed: Dec. 26, 2001

(51) Int. Cl.[7] .......................... B45L 45/00; A63F 13/00; G06F 17/60; E05G 7/00

(52) U.S. Cl. ............................ 101/66; 463/16; 463/25; 235/379; 235/486; 902/30; 902/31; 400/708

(58) Field of Search ............................ 101/66; 463/25, 463/16; 235/379, 406; 902/30, 31; 400/708, 691, 693

(56) References Cited

U.S. PATENT DOCUMENTS

| | | | | |
|---|---|---|---|---|
| 3,791,291 A | * | 2/1974 | Macune et al. | 101/69 |
| 5,010,240 A | | 4/1991 | Sheldon | 235/382 |
| 5,480,245 A | | 1/1996 | Martin | 400/613.2 |
| 5,782,567 A | | 7/1998 | Endo | 400/621 |
| 5,980,138 A | | 11/1999 | Shiozaki et al. | 400/582 |
| 6,012,832 A | | 1/2000 | Saunders et al. | 364/410 |
| 6,014,594 A | | 1/2000 | Heidel et al. | 700/231 |
| 6,048,269 A | | 4/2000 | Burns et al. | 463/25 |
| 6,082,616 A | * | 7/2000 | Lewis et al. | 235/379 |
| 6,280,326 B1 | | 8/2001 | Saunders | 463/25 |
| 6,471,590 B2 | * | 10/2002 | Saunders | 463/25 |

* cited by examiner

*Primary Examiner*—Ren Yan
*Assistant Examiner*—Marvin P Crenshaw
(74) *Attorney, Agent, or Firm*—Mario Theriault

(57) ABSTRACT

In the ticket printer, a ticket tray is mounted next to the infeed adapter of the printer mechanism for feeding blank tickets into the printer mechanism. The ticket tray is releasably mounted in a pullout module by means of a three point attachment comprising a button clip and a button pin. In another aspect of the invention, a ticket presenter has overlapping upper and lower plates defining a ticket delivery gap there between. The delivery gap has a photo sensor mounted therein, a mating bulge and cavity pair, and spikes cooperating with the bulge and cavity pair for effectively separating tickets from a strip of fan-fold tickets. In yet another feature of the present invention there is provided a communication link between the MCU and the PLD of the ticket printer for programming the PLD through the MCU using a personal computer.

12 Claims, 12 Drawing Sheets

TICKET PRINTER FOR GAMING MACHINES

FIELD OF THE INVENTION

This invention pertains to ticket printers especially adapted for installation in gaming machines, and more particularly, it pertains to a ticket printer having structural and operational features that are convenient to the gaming industry.

BACKGROUND OF THE INVENTION

Ticket printers are used in the gaming industry to issue tickets to gamblers for insertion in gaming machines as a substitute for coins or paper money, or for redeeming winnings after one or more games. Generally, a printed ticket shows the amount of money won by or issued to a gambler and a code readable by a gaming machine, containing the credit limit allocated to the gambler carrying the ticket.

Examples of ticket printers used in the gaming industry are disclosed in the following documents:

U.S. Pat. No. 5,480,245, issued on Jan. 2, 1996 to John R. Martin;

U.S. Pat. No. 6,012,832, issued on Jan. 11, 2000 to Michael Saunders et al.;

U.S. Pat. No. 6,014,594, issued on Jan. 11, 2000 to Raymond J. Heidel et al.

U.S. Pat. No. 6,048,269, issued on Apr. 11, 2000 to James G. Burns et al.

U.S. Pat. No. 6,280,326, issued on Aug. 28, 2001 to Michael Saunders.

Although the ticket printers of the prior art deserve undeniable merits, it is believed that there is still a need in the gaming industry for a ticket printer which is easy to maintain, which can reliably dispense tickets with clean edges and which can be programmed using a remote computer.

SUMMARY OF THE INVENTION

The present invention provides a ticket printer which is easy to maintain and to refill with blank tickets, which is efficient in separating and delivering tickets from a stack of fan-fold tickets and which is programmable on line via the Internet.

In accordance with one feature of the present invention, there is provided a ticket printer comprising a chassis and a pullout module movably mounted in the chassis. The pullout module has a front end, a rear end and a latch member in an intermediate region thereof. The pullout module also has a shoulder on the rear end thereof and a pair of slots in that shoulder. A printer mechanism is mounted in the pullout module. The printer mechanism has an inlet side facing the rear end, and a delivery side facing the front end. An infeed adapter is mounted on the inlet side. A ticket presenter is mounted on the delivery side. A ticket tray is mounted between the rear end and the infeed adapter for feeding blank tickets into the infeed adapter and the printer mechanism. The ticket tray has a pair of straight tabs extending rearwardly into the aforesaid slots and a clip releasably engaged with the latch member.

The ticket tray is thereby easily removed from the pullout module for the purpose of filling it with a stack of blank tickets or for replacement thereof with a full tray, by releasing the clip from the latch member and sliding the tabs out of the slots.

In another aspect of the present invention, the ticket printer comprises a pair of telescoping slide rails mounted between the pullout module and the chassis, whereby the pullout module is movable relative to the chassis. A control circuit is mounted in the pullout module and a communication circuit is mounted on the chassis. The control circuit is connected to the communication circuit by a ribbon cable. The ribbon cable has a length which is at least twice as long as a convenient elongation extent of the telescoping slide rails. The ribbon cable is affixed to the chassis over a distance of about one half its length and has a sharp bend defining this distance. The other half of the ribbon cable is free to roll over itself following the movement of the pullout module. This arrangement is advantageous for allowing movement of the pullout module relative to the chassis without applying adverse stress on the ribbon cable.

In a further aspect of the present invention, the ticket presenter comprises overlapping upper and lower plates defining a ticket delivery gap there between. A photo sensor is mounted into one of the upper and lower plates and has a light beam extending across the delivery gap. The leading edge of a ticket moving along the delivery gap is detectable by the photo sensor for the purpose of defining the position of that ticket during or prior to printing.

In yet another aspect of the present invention, the delivery gap of the ticket presenter has a curvature therein adjacent the delivery side of the printer mechanism. A mating bulge and cavity pair is formed in the delivery gap adjacent the curvature. A pair of spikes located near the delivery side of the printer mechanism along the curvature point across the delivery gap. The mating bulge and cavity pair has a width which is about one third of the width of the delivery gap. The distance between the spikes and the mating bulge and cavity pair along the curvature is about the same distance as the width of the bulge and cavity pair. Each of these elements and dimensions contributes to the efficient separation of tickets from a continuous strip of fan-fold ticket blanks having perforated tear lines between the tickets.

Yet in a further feature of the present invention there is provided a ticket printer having a micro controller unit and a programmable logic device. A JTAG port is connected to the programmable logic device for allowing the programming of the programmable logic device using a PLD programmer. A communication parallel, serial or USB port is connected to the micro controller unit for allowing the programming of the micro controller unit using a personal computer. A communication link is provided between the micro controller unit and the programmable logic device for programming the programmable logic device through the micro controller unit using a personal computer. This communication link between the micro controller unit and the programmable logic device is advantageous for allowing the programming or reprogramming of the ticket printer from a remote location, such as through the Internet for example.

BRIEF DESCRIPTION OF THE DRAWINGS

One embodiment of the present invention is illustrated in the accompanying drawings, in which like numerals denote like parts throughout the several views, and in which.

DESCRIPTION OF THE PREFERRED EMBODIMENT

Figure 1:
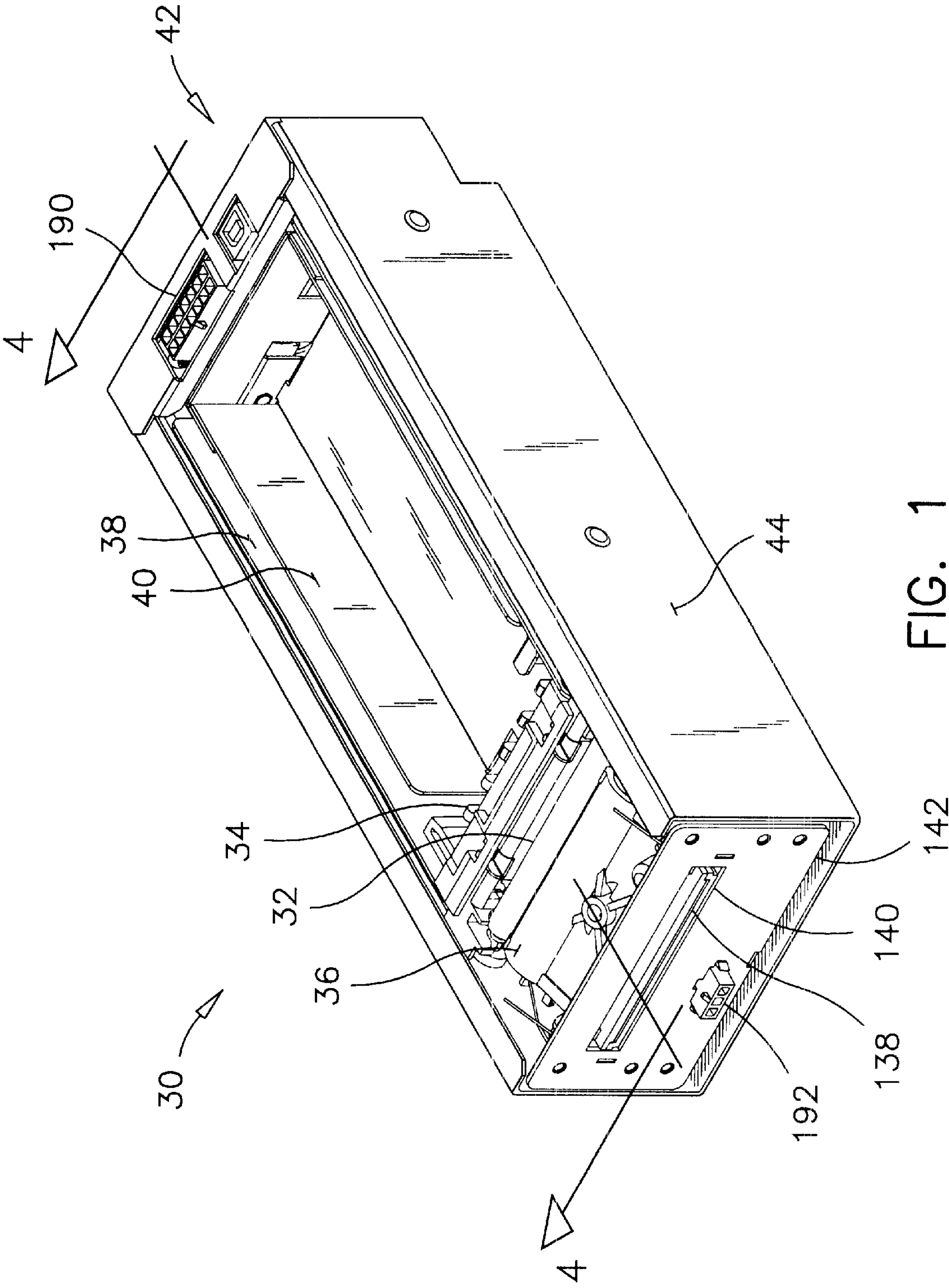
FIG. 1 is a front, right side and top perspective view of the ticket printer according to the preferred embodiment.

While this invention is susceptible of embodiments in many different forms, there is shown in the drawings and will be described in details herein one specific embodiment of the present invention, with the understanding that the present disclosure is to be considered as an example of the principles of the invention and is not intended to limit the invention to the embodiment illustrated and described.

Referring to the FIGS. 1–5, the ticket printer 30 according to the preferred embodiment comprises broadly; a printer mechanism 32 having an inlet side and a delivery side; an infeed adapter 34 mounted to the inlet side; a ticket presenter 36 mounted to the delivery side; a pullout module 38 enclosing the printer mechanism, the infeed adapter, the ticket presenter, and a ticket tray 40 mounted adjacent the infeed adapter 34. The preferred ticket printer also comprises a communication circuit 42, and a chassis 44 in which the pullout module is movably mounted. The communication circuit 42 is mounted at the rear end of the chassis 44. The ticket presenter 36 defines the front end of the ticket printer 30. The printer mechanism 32 is controlled by a circuit board 46, which is mounted under the ticket tray 40 and which is connected to the communication circuit 42 by a ribbon cable 48.

The control circuit board 46 is mounted over the bottom wall of the pullout module 38, and is covered by a guard plate 54, referred to herein as the circuit guard plate.

Figure 20:
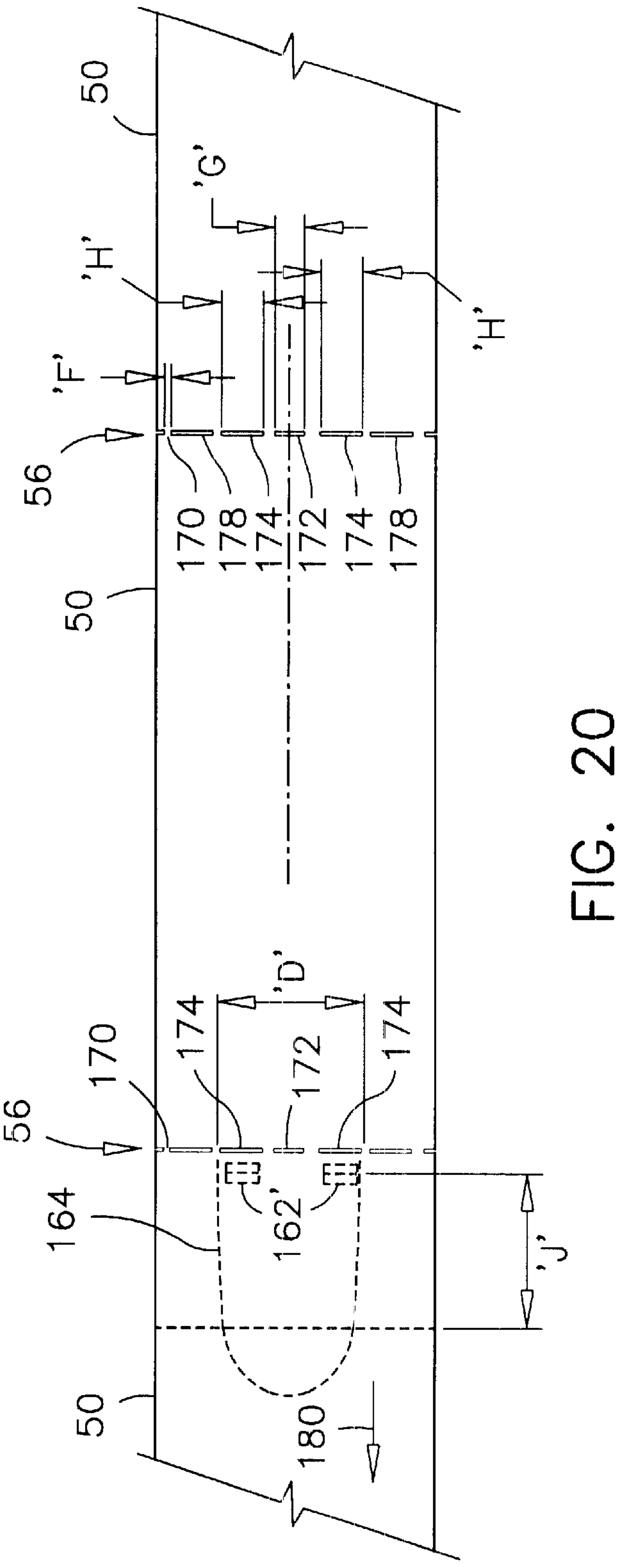
FIG. 20 is a partial plan view of two adjacent tickets, showing on the left, transposed relevant dimensions of the ticket presenter, and on the right, relevant dimensions of the tear line between adjoining tickets.
Figure 21:
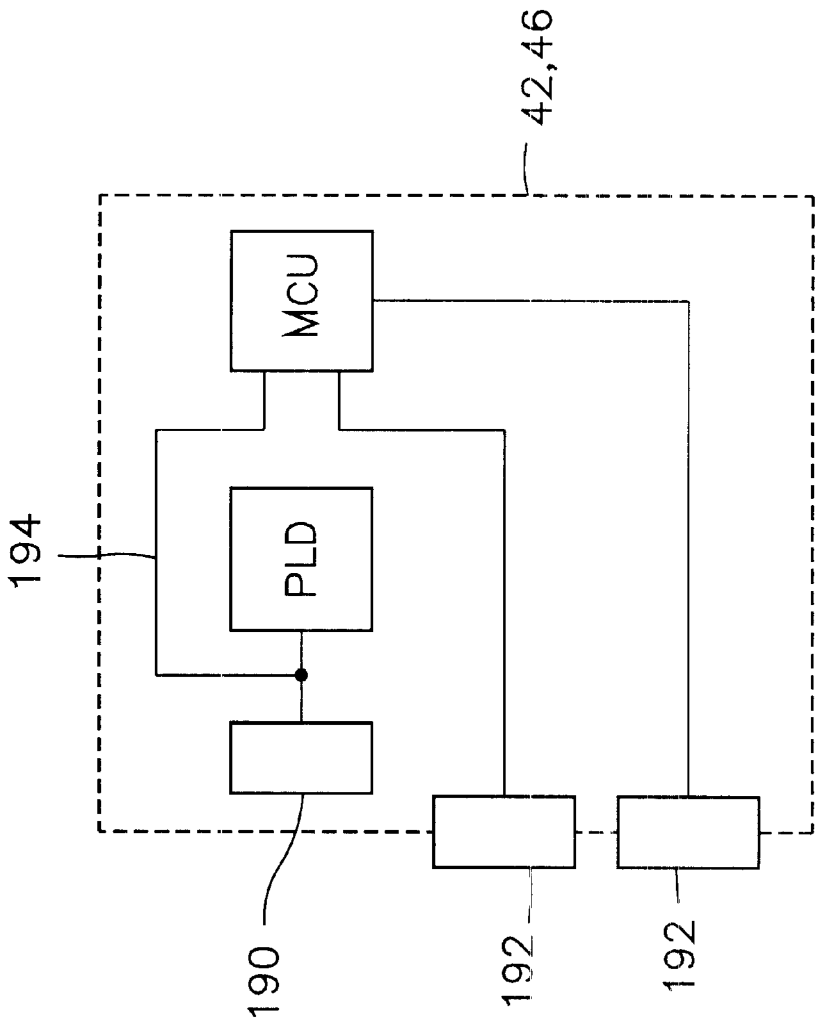
FIG. 21 is a schematic diagram of the electronic controls comprised in the preferred ticket printer.

In use, the blank tickets 50 are supplied to the printer mechanism 32 from a stack 52 of continuous tickets separable from each other by means of a transverse tear line 56 between adjacent tickets. The transverse tear line 56 is illustrated in FIG. 20. These tickets are often referred to as fan-fold tickets.

Having briefly described all the major components of the preferred ticket printer 30, the functions and structural features of these components will now be described in more details.

Printer Mechanism

The printer mechanism 32 is a thermal printer unit known in the industry as an Axiohm Atom MHTP(2)™ printer mechanism. This printer mechanism does not constitute the essence of the present invention and therefore is not described in more details herein.

Chassis

The chassis 44 is made of bent sheet metal and has a rectangular box-like shape. The chassis is mountable into the housings of a variety of gaming machines, by various means which have not been illustrated herein for not being essential to the present invention.

Pullout Module

Figure 2:
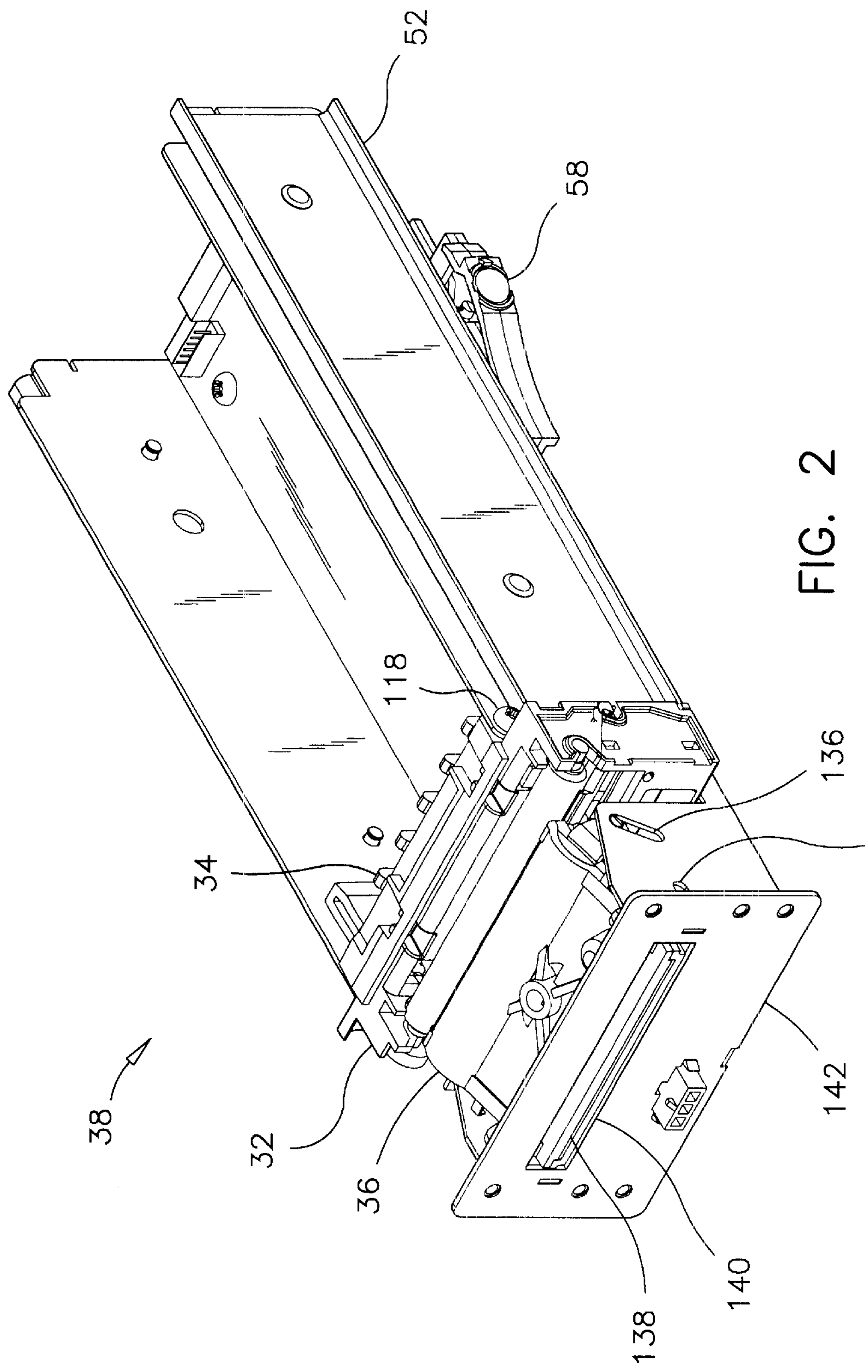
FIG. 2 is a front, right side and top perspective view of the pullout module comprised in the ticket printer.
Figure 5:
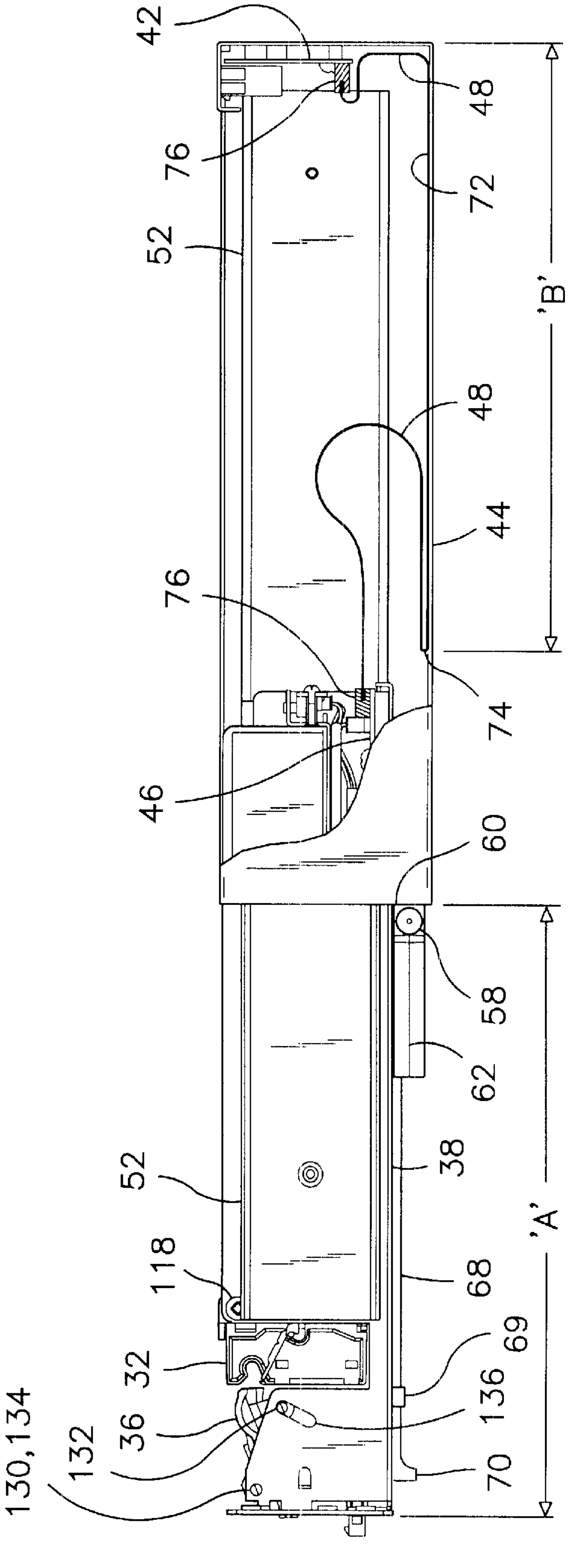
FIG. 5 is a cut-away side view of the ticket printer with the pullout module partly drawn out of the chassis.

The pullout module 38 is movably mounted inside the chassis 44 by means of a pair of slide rails 52 which can be seen in FIGS. 2 and 5. The slide rails 52 are of the telescoping type and have a convenient elongation extent labelled as ‘A’ in FIG. 5 for reference purposes. This convenient elongation extent ‘A’ is the distance at which the pullout module 38 must be pulled out of the chassis 44 for easily filling or replacing the ticket tray 40 and for inserting a leading ticket into the infeed adapter 34. It will be appreciated that the pullout module 38 can also be drawn out clear of the chassis 44 for maintenance purposes.

The pullout module 38 is retainable in the open position by a pair of latch tabs 58 which are illustrated in FIGS. 2, 3, 4 and 5. The latch tabs 58 engage with the front edge 60 of the chassis 44, as shown in FIG. 5 when the pullout module 38 is open the distance ‘A’ as also illustrated in FIG. 5. This feature is particularly appreciable when the ticket printer 30 is mounted along an angle with the front end thereof facing upward, as it is often the case with the ticket printers of gaming machines.

Figure 3:
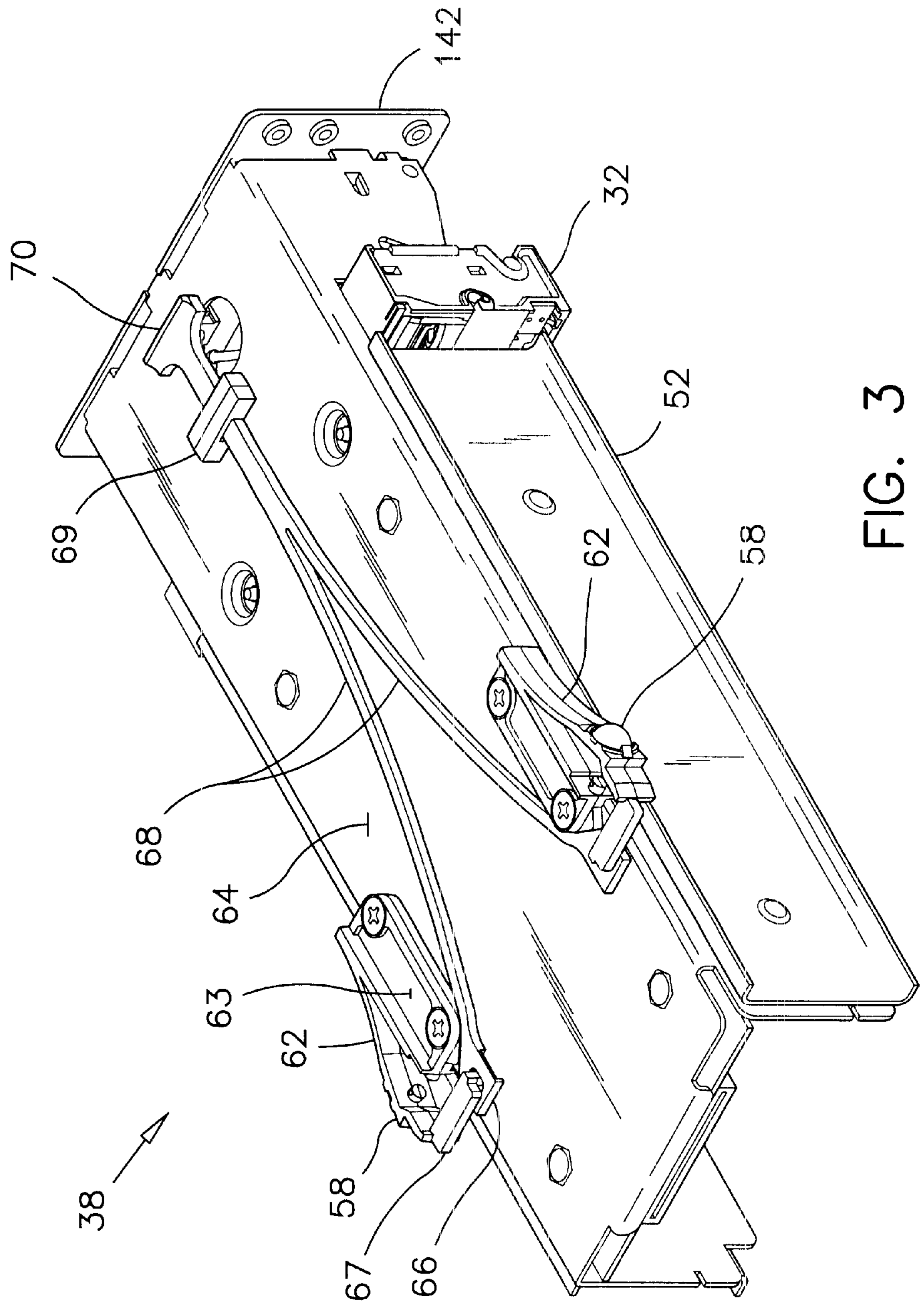
FIG. 3 is a rear, right side and bottom perspective view of the pullout module comprised in the ticket printer.

Referring particularly to FIGS. 3 and 5, the latch tabs 58 are normally urged outwardly by respective leaf springs 62 affixed to a pair of base blocks 63 which are mounted to the bottom surface 64 of the pullout module 38. Cam plates 66 are connected to the latch tabs 58 by link members 67, and to tendons 68. The tendons 68 extend toward the front end of the pullout module 38 and though a guide bearing 69. The tendons 68 terminate into a common handle 70 located underneath the front end of the pullout module 38. In use, the handle 70 is pulled toward the front end of the pullout unit 38 to cause the cam plates 66 to slide forward against the base blocks 63 and to pull the latch tabs 58 inwardly, allowing the pullout unit 38 to be retracted inside the chassis 44.

In the illustration of FIG. 5, the pullout module 38 is drawn out of the chassis 44 a distance corresponding to the convenient elongation extent 'A'. In this illustration, it will be appreciated that the ribbon cable 48 is at least twice as long as the convenient elongation extent 'A'. The ribbon cable 48 has a straight portion 72 laid against the bottom wall of the chassis 44, which straight portion extends a distance 'B' from a rear end of the chassis 44. The ribbon cable 48 has a sharp bend 74 formed therein, defining the dimension 'B'. The distance 'A' is a similar distance as the length 'B' of the straight portion 72 of the ribbon cable 48 such that there is no bending or fatigue stress applied to the sharp bend 74 when the pullout module 38 is drawn out of the chassis 44, to the convenient elongation extent. Connectors 76 at both ends of the ribbon cable 48 can be disconnected from the communication circuit 42 and from the control circuit board 46, respectively when the pullout module 38 needs to be removed from the chassis 44 for replacement or for major repair.

Ticket Tray

Figure 4:
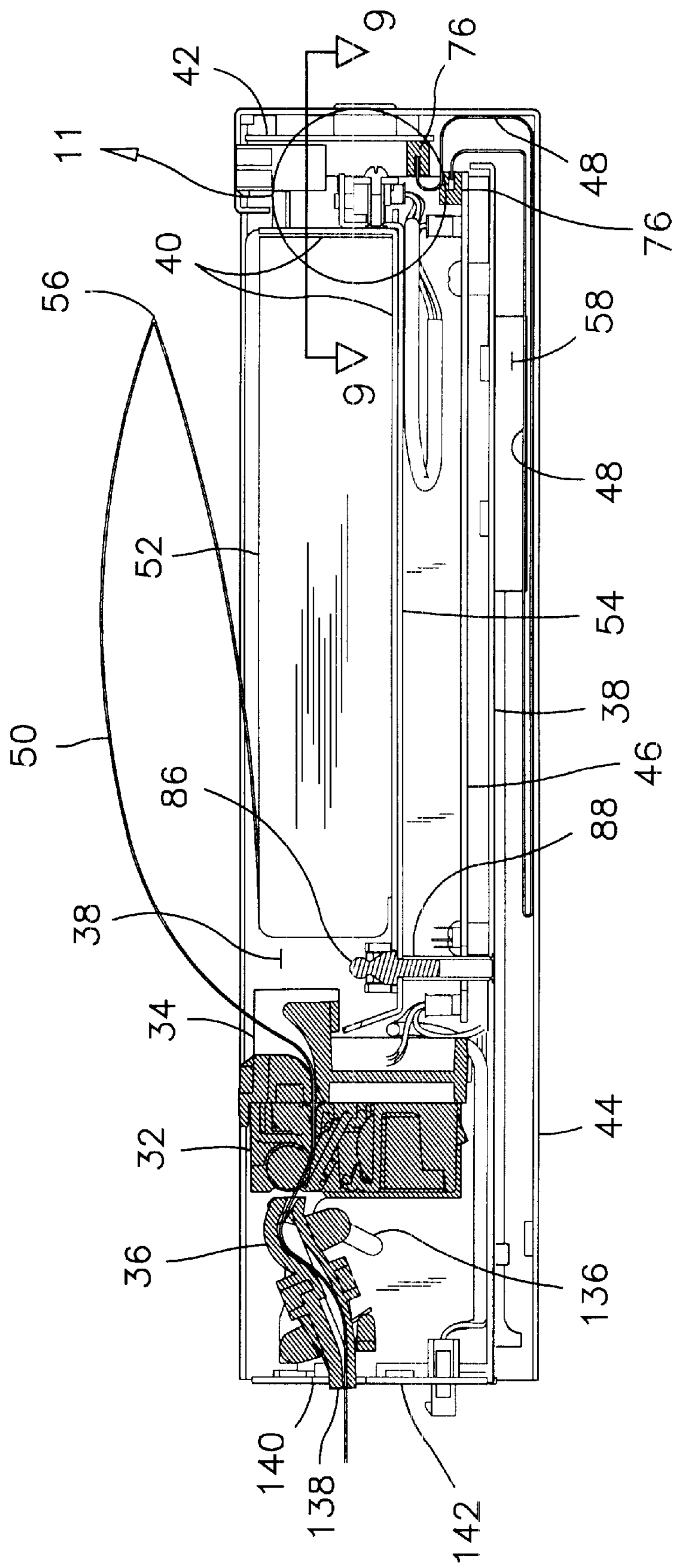
FIG. 4 is a cross-section view of the ticket printer, as viewed along line 4—4 in FIG.1.
Figure 8:
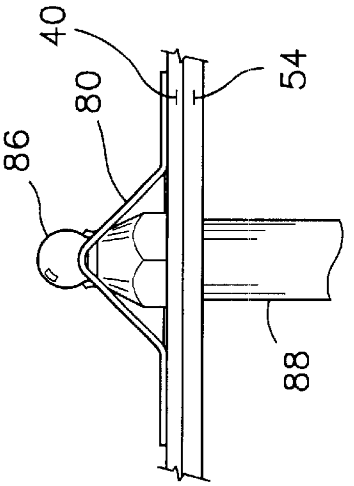
FIG. 8 is a front view of the button pin and button clip holding the ticket tray in place in the pullout module.
Figure 7:
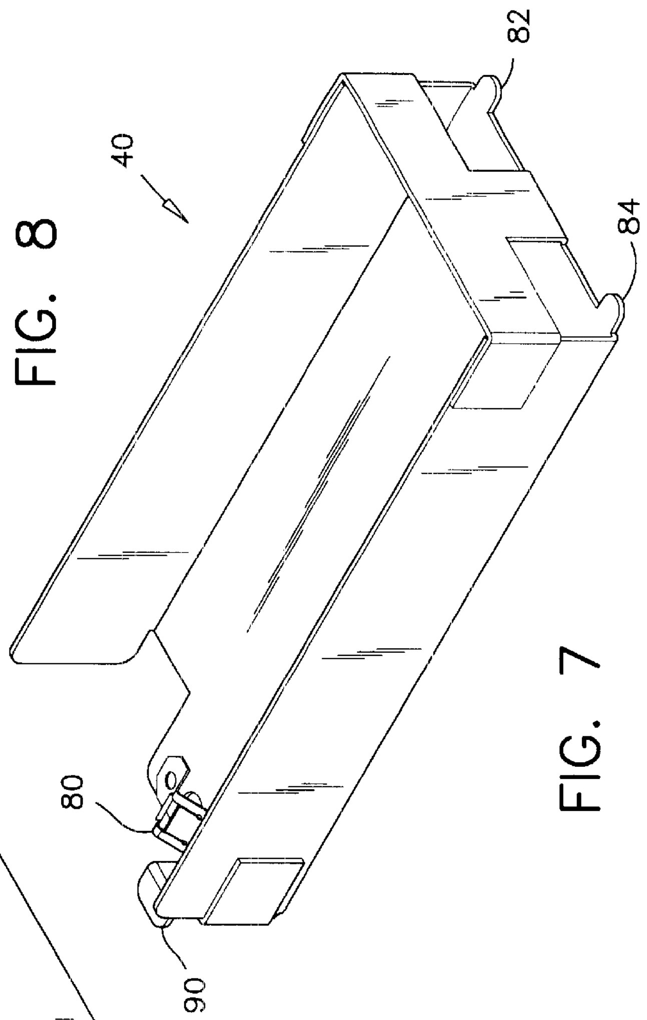
FIG. 7 is a rear, top and right side perspective view of the ticket tray.
Figure 6:
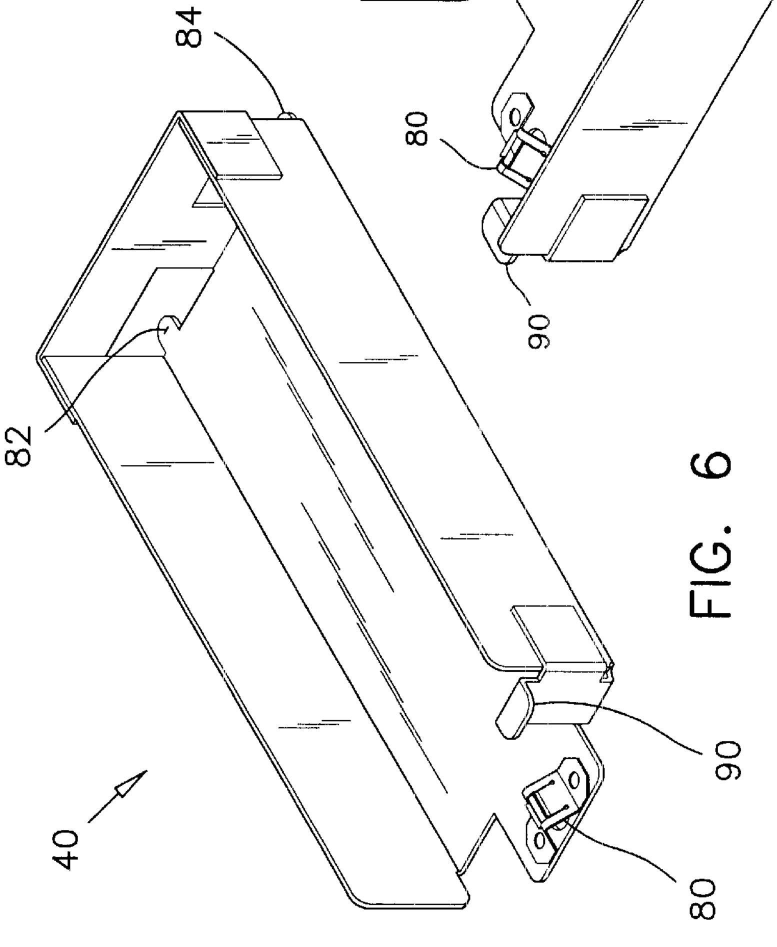
FIG. 6 is a front, top and right side perspective view of the ticket tray mountable in the ticket printer according to the preferred embodiment.
Figure 10:
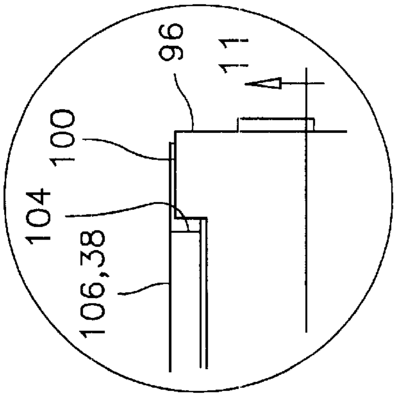
FIG. 10 is an enlarged view of the structural details shown in the detail circle 10 in FIG. 9.
Figure 11:
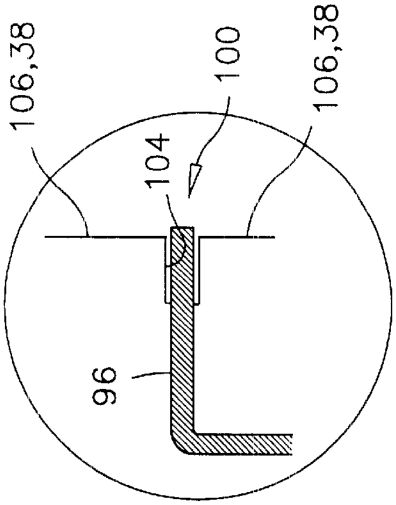
FIG. 11 is an enlarged view of the structural details shown in the detail circle 11 in FIG. 4, and generally along the cross-section line 11, in FIG. 10.
Figure 9:
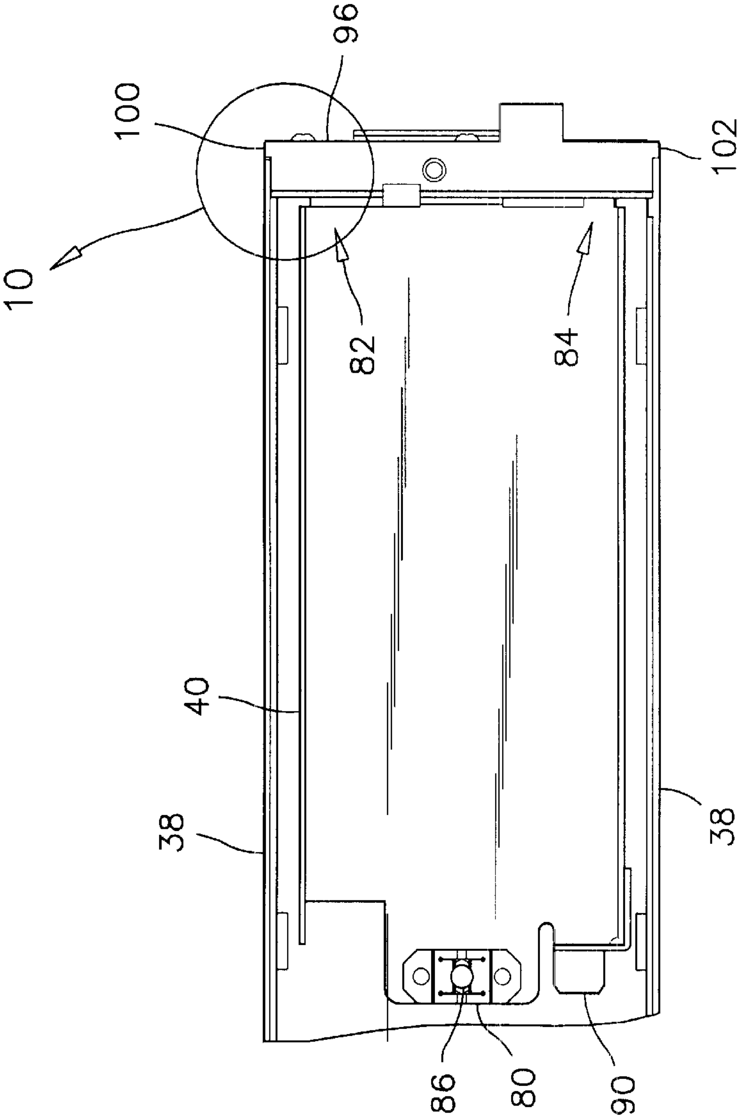
FIG. 9 is a partial top view of the ticket printer according to the preferred embodiment.

Referring now to FIGS. 6–8, 12 and 13, the ticket tray 40, the circuit guard plate 54 and the attachment of the two components to the pullout module will be described in details. The ticket tray 40 is rectangular in shape and has side walls which are sufficiently high to contain a stack of tickets for a convenient period of operating time. The ticket tray 40 is removably retained to the pullout module 38 by means of a three-point attachment which consists of a button clip 80 at the front end thereof and a pair of straight tabs 82, 84 extending at the rear end thereof. The button clip 80 attaches to a button pin 86 which is fastened to a threaded insert 88 as shown in FIGS. 4 and 8, which in turn is fastened to the bottom wall of the pullout module 38. A finger tab 90 is provided on the front end of the ticket tray 40 to facilitate the releasing of the clip 80 from the button pin 86.

Figure 13:
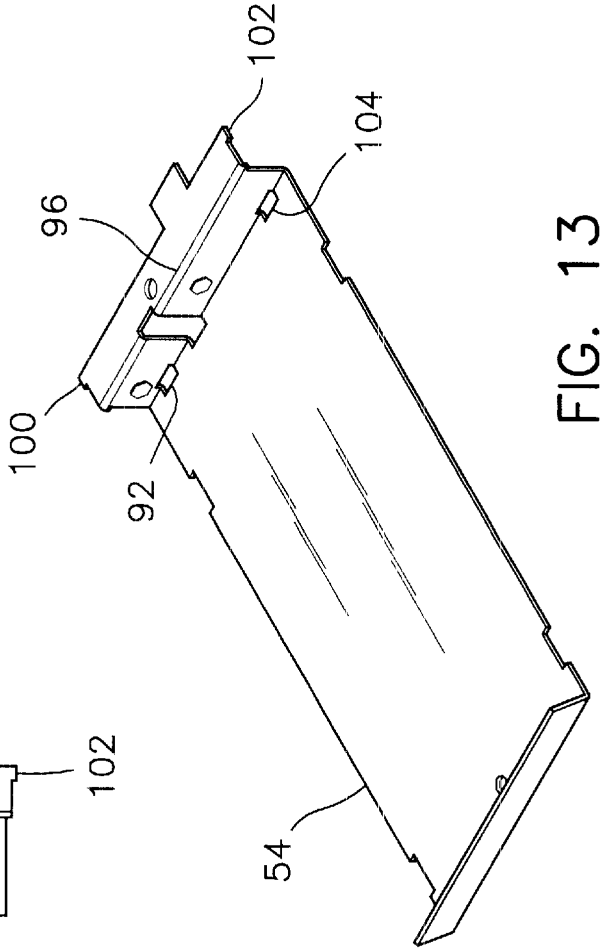
FIG. 13 is a front, right side and top perspective view of the circuit guard plate.
Figure 12:
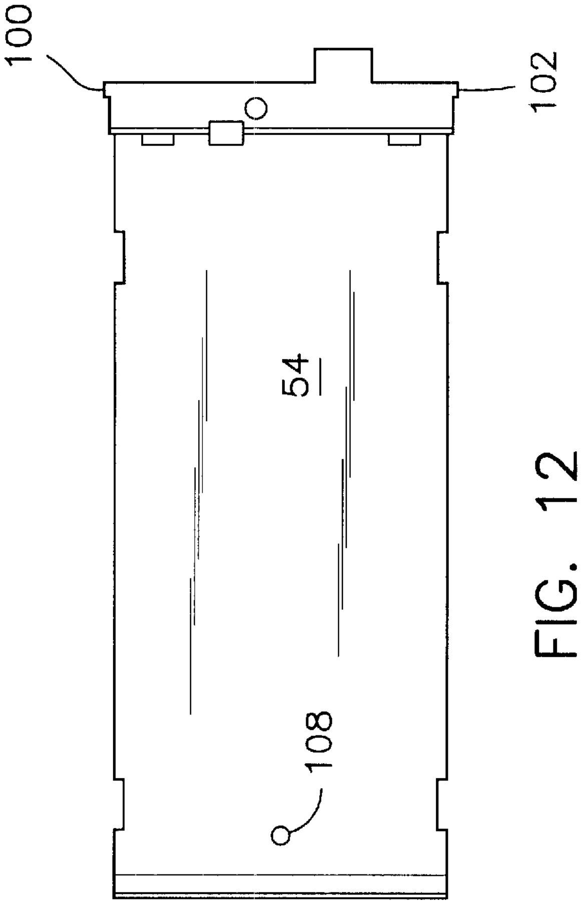
FIG. 12 is a plan view of the circuit guard plate.

Both tabs 82, 84 are insertable into a pair of slots 92, 94 in a rear shoulder 96 on the circuit guard plate 54, as shown in FIG. 13. Thus, the ticket tray 40 is removable from the pullout module 38 by simply pulling it upward out of the button pin 86 and then forward out of the engagement of the tabs 82, 84 from the slots 92, 94.

This ticket tray 40 is particularly advantageous for being easily removed from the pullout module 38 for the purpose of filling it with a full stack of blank tickets, or for replacing it with a full ticket tray when empty. It will be appreciated that several ticket trays 40 may be kept for a same ticket printer 30, with each tray containing tickets for a different game or for a different day of the week for example. The appropriate ticket tray can then be installed or removed from the ticket printer in a short time whenever a new game is played with the gaming machine in which the preferred ticket printer 30 is installed.

Circuit Guard Plate

Referring now to FIGS. 4 and 9–13, there are illustrated therein various structural details of the circuit guard plate 54 covering the control circuit board 46. The rear shoulder 96 on the circuit guard plate 54 has tabs 100, 102 which are insertable into corresponding notches 104 along the rear end of the side walls 106 of the pullout module 38. The front end of the circuit guard plate 54 has a hole 108 therein the size of which corresponds to the inside diameter of the threaded insert 88. The front end of the circuit guard plate 54 is removably retained to the threaded insert 88 by the threaded engagement of the button pin 86 into the threaded insert 88 as shown in FIG. 8. The rear end of the circuit guard plate is removably retained to the side walls 106 of the pullout module 38 by the engagement of the tabs 100, 102 into the notches 104. The guard plate 54 is thereby easily removed in a same way as for the previously explained ticket tray 40, for exposing the control circuit board 46.

Infeed Adapter

Figure 16:
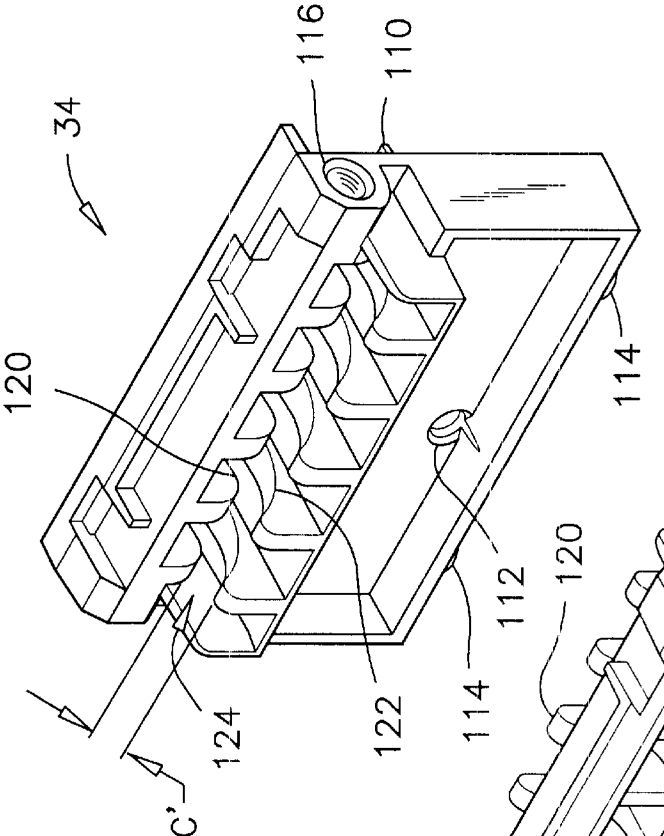
FIG. 16 is a rear, left side and top perspective view of the infeed adapter.
Figure 15:
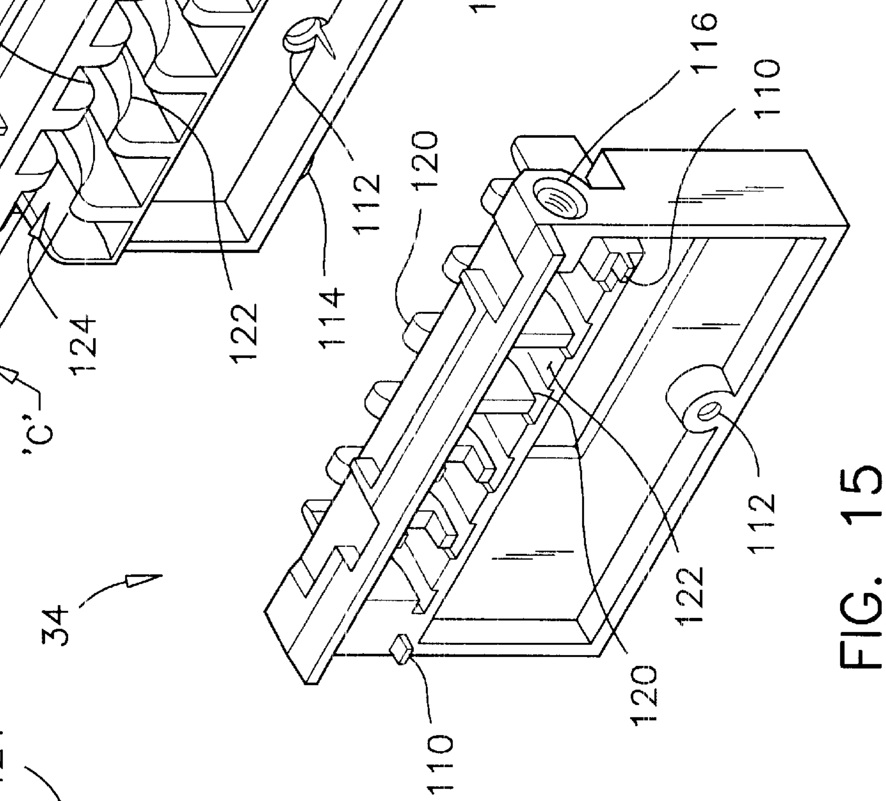
FIG. 15 is a front, right side and top perspective view of the infeed adapter.
Figure 14:
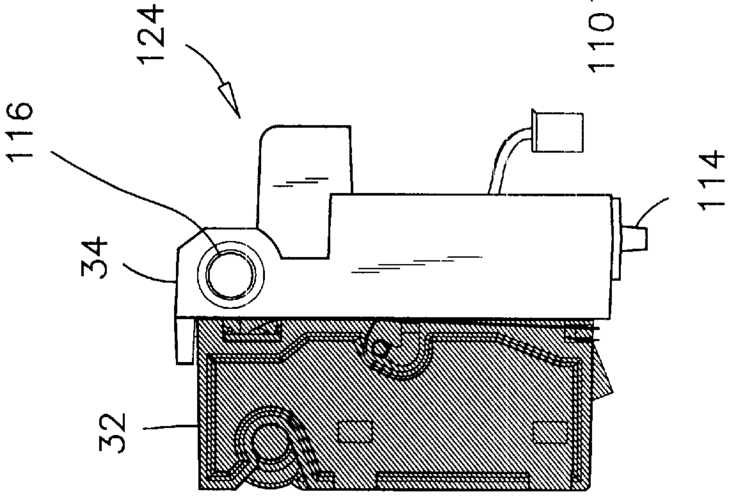
FIG. 14 is a right side view of the printer mechanism and the infeed adapter assembly.

Referring now to FIGS. 14–16, the infeed adapter 34 is illustrated therein in three views. The infeed adapter 34 is preferably moulded in one piece with plastic material. In its preferred configuration, the infeed adapter 34 has two alignment pins 110 and one threaded insert 112 for attachment thereof to the printer mechanism 32. The infeed adapter 34 further has position pins 114 extending from the lower side thereof, and threaded inserts 116 and screws 118 in its sides for retaining the printer mechanism 32 and the infeed adapter 34 assembly to the bottom and side walls of the pullout module 38. One of the screws 118 is illustrated in FIGS. 2 and 5.

A series of upper fingers 120 and lower fingers 122 define a tapering opening for feeding the tickets to the printer mechanism 32. The tapering opening 124 has a preferred gap size 'C' of at least 0.125 inch (3 mm) such that is relatively easy for an operator to feed a leading ticket into the printer mechanism 32.

Ticket Presenter

The ticket presenter 36 is fastened to the pullout module 38 by means of two pairs of pins 130, 132 engaged into corresponding openings 134, 136 in the side walls of the pullout module 38 as can be seen in FIGS. 2–5, 17 and 19. The ticket presenter 36, has a ticket delivery spout 138 which protrudes into or otherwise aligns with a rectangular opening 140 through the front wall 142 of the pullout module 38 as illustrated in FIGS. 1–4.

The ticket presenter 36 consists of an upper plate 144 and a lower plate 146 which are mounted against each other leaving a ticket delivery gap 148 there between through which the tickets are fed out of the printer mechanism. The forward edges of the upper and lower plates 144, 146 and the gap 148 constitute the ticket delivery spout 138.

A photo sensor and diode assembly 150, hereinafter referred to as the photo sensor, is mounted in the lower plate 146, of the ticket presenter 36, for sensing the leading edge of a ticket being fed through the delivery gap 148. The upper plate 144 has a cavity 152 therein extending above the photo sensor 150 a distance above the focal point 154 of the photo sensor 150, such that the photo sensor does not receive any reflection other than from the leading edge of a ticket moving along the delivery gap 148.

In use, prior to printing a ticket, the leading edge of a blank ticket is detected by the photo sensor 150; the feeding motion of the printer mechanism stops and the ticket is retracted a programmed distance to align the printing mechanism 32 with the exact location of the prescribed first print line on the ticket. Then, printing of the ticket is initiated.

Figure 19:
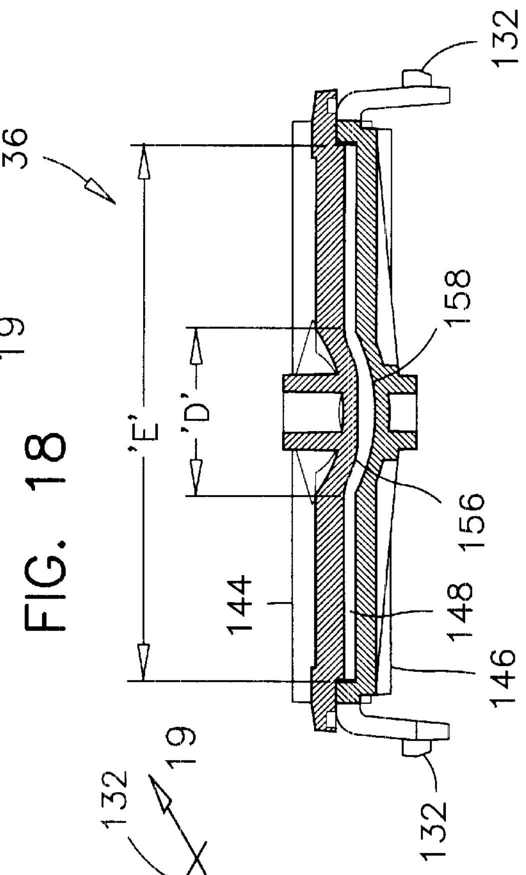
FIG. 19 is a cross-section view of the ticket presenter as seen along line 19—19 in FIG. 17 or in FIG. 18.

The ticket presenter 36 further has a mating bulge 156 and cavity 158 pair adjacent an upper curvature 160 in the upper plate 144, and a pair of spaced-apart spikes 162 in the lower plate 146 to facilitate the tearing of a ticket fed through the ticket delivery gap 148. The preferred width 'D' of the bulge and cavity pair 156, 158 is about one third the width 'E' of a ticket being fed through the ticket presenter, as shown in FIG. 19.

For more clarity, the positions of the spikes 162 are shown in dashed lines and are labelled as 162' in the illustration of FIG. 20. FIG. 20 also illustrates the interaction between the spikes 162 and the bulge and cavity pair 156, 158.

The spikes 162 are located in a central portion of the ticket presenter and extend into the ticket delivery gap 148. The position of the spikes 162 overlap or lie within the deformation footprint 164 created by the bulge and cavity pair 156, 158 when the ticket 50 is fed out of the printer mechanism.

Referring again to FIG. 20, the tear line 56 between two tickets 50 consists of six spaced-apart tendons 170 separating open slits 172, 174 and 178. The preferred width 'F' of each tendon is about 0.030 inch (0.75 mm) on a ticket strip having a width 'E' of about 2.56 inch (65 mm). The central slit 172 has a preferred width 'G' of about 0.32 inch (8 mm). The next intermediate slits 174 have a respective width 'H' of about 0.5 inch (12.7 mm). The preferred paper thickness for the ticket strip is about 0.004 inch (0.1 mm);(10M/20 lb).

The deformation footprint 164 of the bulge and cavity pair 156, 158 is illustrated in FIG. 20 and encompasses the central slit 172 and the two intermediate slits 174. The deformation footprint 164 of the bulge and cavity pair 156, 158 also encompasses the position of the spikes 162'.

Each spike 162 is slightly narrower than one of the intermediate slits 174. Both spikes 162 are aligned with these intermediate slits 174, such as to engage with the intermediate slits 174, when the ticket strip is pulled out of the ticket presenter 36.

The deformation footprint 164 in a leading ticket 50 caused by the bulge and cavity pair 156, 158, while the next ticket 50 is held straight in the printer mechanism 32, causes the tendons 170 bordering the central slit 172 to break, thereby opening the central and intermediate slits 172, 174 as a single cut.

Figure 17:
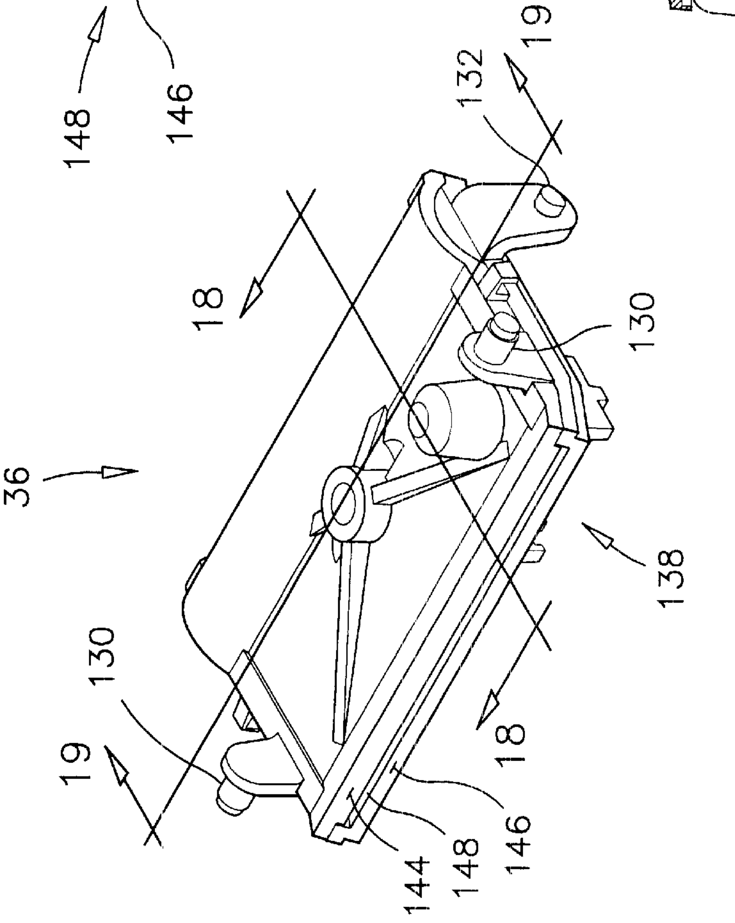
FIG. 17 is a front, right side and top perspective view of the ticket presenter.

The spikes 162 are located immediately below and extend toward the upper curvature 160 in the upper plate 144, as shown in FIG. 17. The curvature 160 in the upper plate 144 has an arc length 'J' following the spikes 162 which is substantially the same as the width 'D' of the deformation footprint 164. This dimension ratio has been found advantageous for effectively breaking the central tendons and for causing the spikes 162 to grab the tear line 56.

When the ticket 50 is pulled out of the ticket presenter 36 in the direction of arrow 180 in FIG. 20, the ticket 50 is forced to slide with a certain pressure against the apexes of the spikes 162. The deformation 164 of the ticket due to the bulge and cavity pair 156, 158, the curvature 160 in the upper plate and the positions of the spikes 162 relative to the curvature 160 and to the bulge and cavity pair 156, 158, cooperate to cause the spikes 162 to grab against the slits 174 in the tear line. A further pulling on the ticket 50 causes the tear line 56 to separate completely.

Figure 18:
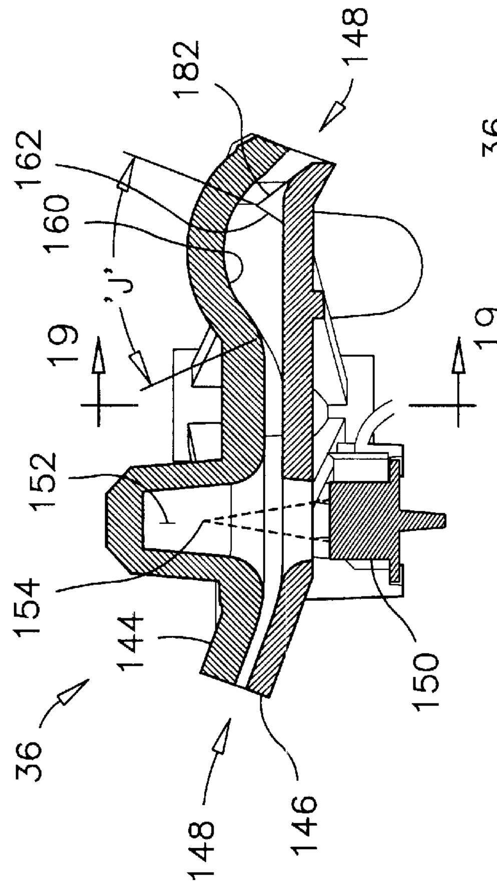
FIG. 18 is a cross-section view of the ticket presenter as seen along line 18—18 in FIG. 17.

Both spikes 162 have an inclined rear surface 182 as seen in FIG. 18, such that a ticket 50 being fed through the printer mechanism is guided freely into the ticket delivery gap 148 and along the curvature 160.

The structural features of this ticket presenter 36 make it particularly easy to tear off the leading ticket 50 from a strip of fan-fold tickets 52, starting at the centre of a tear line and progressing outwardly such that the tear line remains clean.

Electronic Controls.

The electronic controls of the ticket printer 30 comprise the communication circuit 42 and the control circuit 46 as mentioned before. One of these circuits comprises a micro controller unit MCU. A programmable logic device PLD is also part of that control circuitry. The programmable logic device is connected to a JTAG port 190 for the purpose of being programmable using PLD programmer. The micro controller unit is connected to one or more standard communication parallel, serial or USB ports 192 for the purpose of programming the PLD using a host computer, as will be explained below. The micro controller unit is also connected to the JTAG port 190 by way of a communication link 194 for the purpose of communicating programming instructions to the PLD through the micro controller unit. The standard communication ports 192 are mounted through the wall of the pullout module such that no disassembly of the module is required to program the PLD.

The communication link 194 and a communication protocol have been provided between the micro controller unit, the communication ports 192 and the JTAG port 190 to allow the transmission of programming commands from the micro controller unit to the programmable logic device. It will be appreciated that the communication link 194 and the communication protocol enable the programming, reprogramming or troubleshooting of the programmable logic device through the standard communication port of a host computer or via the Internet or any other network through a remote computer.

It will be appreciated that the electronic controls also contain a number of switches and sensors which have not been described herein for being generally known in the field of printing machines. These switches and sensors may include for examples; a paper low sensor, limit switches for monitoring the movements of the pullout module, a ticket tray position sensor or a bar code reader.

As to other manner of usage and operation of the present invention, the same should be apparent from the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

We claim:

1. A ticket printer comprising a chassis and a pullout module movably mounted in said chassis, said pullout module comprising:

a front end, a rear end and a latch member mounted to an intermediate region thereof;

a shoulder on said rear end and a slot in said shoulder;

a printer mechanism mounted thereto and having an inlet side facing said rear end and a delivery side facing said front end;

an infeed adapter mounted on said inlet side;

a ticket presenter mounted on said delivery side, and a ticket tray mounted between said rear end and said infeed adapter for feeding tickets into said infeed adapter and said printer mechanism, said ticket tray having a straight tab extending rearwardly into said slot and a clip releasably engaged with said latch member;

such that said ticket tray is removable from said pullout module for filling said ticket tray with tickets, by releasing said clip from said latch member and sliding said tab out of said slot.

2. The ticket printer as claimed in claim 1, wherein latch member is a button pin and said clip is a button clip.

3. The ticket printer as claimed in claim 1, further comprising a slide rail mounted between said pullout module and said chassis.

4. The ticket printer as claimed in claim 3, further comprising a control circuit mounted in said pullout module and a communication circuit mounted on said chassis, and said control circuit being connected to said communication circuit by a ribbon cable.

5. The ticket printer as claimed in claim 4, wherein said rail has a convenient elongation extent and said ribbon cable has a length which is at least twice said convenient elongation extent.

6. The ticket printer as claimed in claim 5, wherein said ribbon cable is affixed to said chassis over a distance of about one half said length and has a sharp bend defining said distance.

7. The ticket printer as claimed in claim 5, wherein said pullout module further comprises a latch tab having means to engage with said chassis for retaining said pullout module at said convenient elongation extent relative to said chassis, and means for manually disengaging said latch tab from said chassis.

8. The ticket printer as claimed in claim 1, wherein said infeed adapter comprises two alignment pins and a screw retaining said printer mechanism thereto.

9. The ticket printer as claimed in claim 1, further comprising a control circuit mounted under said ticket tray and a circuit guard plate mounted between said control circuit and said ticket tray, and said circuit guard plate being affixed to said pullout module by a tab and slot engagement and by said latch member.

10. The ticket printer as claimed in claim 8, wherein said infeed adapter has a tapering opening having a gap size of at least 0.125 inch.

11. The ticket printer as claimed in claim 1, wherein said ticket presenter comprises overlapping upper and lower plates defining a ticket delivery gap there between, and a photo sensor mounted to one of said upper and lower plates and having a light beam extending across said delivery gap.

12. The ticket printer as claimed in claim 1, further comprising:

a micro controller unit;

a programmable logic device;

a JTAG port connected to said programmable logic device for programming said programmable logic device using a PLD programmer;

a communication port selected from a parallel, a USB and a serial port connected to said micro controller unit for transmitting programming commands to said micro controller unit using a host computer, and a communication link between said micro controller unit and said programmable logic device for transmitting programming commands to said programmable logic device through said micro controller unit using a host computer.

* * * * *